United States Patent [19]

Hanaoka

[11] 4,363,052

[45] Dec. 7, 1982

[54] THERMOMAGNETIC RECORDING DEVICE

[75] Inventor: Naohiro Hanaoka, Hachioji

[73] Assignee: Olympus Optical Co., Ltd., Tokyo, Japan

[21] Appl. No.: 168,283

[22] Filed: Jul. 10, 1980

[30] Foreign Application Priority Data

Jul. 17, 1979 [JP] Japan ................................. 54-90659

[51] Int. Cl.$^3$ .......................... G11B 5/02; G11B 5/22; G11B 5/25
[52] U.S. Cl. ..................................... 360/59; 360/119; 360/122
[58] Field of Search ................... 360/59, 119, 122, 110

[56] References Cited

U.S. PATENT DOCUMENTS

| 3,230,517 | 1/1966 | Supernowicz | 360/119 |
| 3,313,889 | 4/1967 | Machinski | 360/119 |
| 3,521,294 | 7/1970 | Treves | 360/59 |
| 3,582,570 | 6/1971 | Cushner | 360/59 |
| 3,626,114 | 12/1971 | Lewicki et al. | 360/59 |
| 3,676,867 | 7/1972 | Bacon et al. | 360/59 |
| 3,778,791 | 12/1973 | Lewicki et al. | 360/59 |
| 4,138,685 | 2/1979 | Kellermen | 360/59 |
| 4,251,842 | 2/1981 | Iwasaki et al. | 360/119 |

FOREIGN PATENT DOCUMENTS 3018415 11/1980 Fed. Rep. of Germany .
5180134 of 1978 Japan .

OTHER PUBLICATIONS

"CrO$_2$-Based Thermomagnetic Information & Retrieval Systems" by R. K. Waring Jr, Jour. Appd. Physics, vol. 42H4, 3/15/71, pp. 1763-1768.

Primary Examiner—Vincent P. Canney
Attorney, Agent, or Firm—Frishauf, Holtz, Goodman & Woodward

[57] ABSTRACT

A thermomagnetic recording device for recording information on a magnetic recording medium having magnetic anisotropy across the thickness thereof comprises a laser beam irradiation mechanism applying a laser beam to said magnetic recording medium to reduce the coercive force thereof, and a single-pole magnetic head including a ferromagnetic thin membrane having an end face located opposite to said magnetic recording medium, a main body supporting said thin membrane, and a coil applying a perpendicular magnetic field to said recording medium through said end face of said thin membrane.

8 Claims, 3 Drawing Figures

THERMOMAGNETIC RECORDING DEVICE

BACKGROUND OF THE INVENTION

This invention relates to a thermomagnetic recording device for recording information such as sounds and pictures on a magnetic layer having magnetic anisotropy in a direction perpendicular to the surface thereof and temperature-dependent coercive force.

Thermomagnetic recording devices of this type can perform high-density recording with markedly higher efficiency, as compared with devices having a ring-shaped magnetic head which is conventionally used in combination with a magnetic disk or the like. In such a recording operation, a magnetic layer is heated by spot-irradiation with a laser beam, the coercive force of a heated portion is reduced by utilizing the temperature-dependence of the coercive force of the magnetic layer, and a signal field is applied to such portion for magnetic recording.

In order to increase the recording density with these recording devices, it is necessary to reduce the enlargement of a magnetized region by delicate control of the laser beam and control of the applied magnetic field. Presently, however, it is hard to apply the laser beam to a limited region. Moreover, it is quite difficult to magnetize a very limited region with few magnetic field components along a direction perpendicular to the magnetic layer, because the magnetic layer is liable to be heated so that the temperature may be gradually lowered from the beam center of the laser beam toward the periphery thereof, thereby extending the magnetizable region, and because a signal field is applied by means of a notched ring-shaped magnetic head. Thus, the magnetized region becomes relatively large, so that the playback resolution and recording efficiency will be deteriorated.

SUMMARY OF THE INVENTION

The object of this invention is to provide a thermomagnetic recording device capable of applying a perpendicular magnetic field only to a very narrow region of a beam-heated portion of a magnetic layer having magnetic anisotropy perpendicular to the surface thereof and temperature-dependent coercive force, thereby limiting the magnetized region and improving high-density recording efficiency and playback resolution.

BRIEF DESCRIPTION OF THE DRAWINGS

FIGS. 1 to 3 show an embodiment of the thermomagnetic recording device of this invention, in which:

FIG. 1 is a structural diagram;

FIG. 2 is an enlarged perspective view of a magnetic head; and

FIG. 3 is a plan view showing the state of tracking.

DETAILED DESCRIPTION OF THE PREFERRED EMBODIMENT

Now there will be described an embodiment of this invention with reference to the accompanying drawing.

Figure 1:
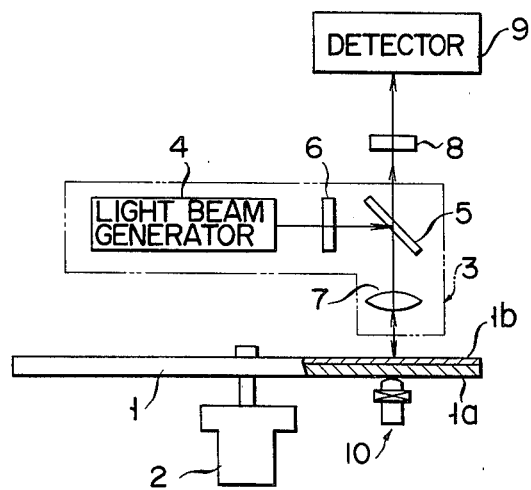

In FIG. 1 numeral 1 designates a magnetic recording medium which comprises a disk-like base 1a formed of synthetic resin or other nonmagnetic material and a magnetic layer 1b covered over the surface of the base 1a. The magnetic layer 1b is a thin film of Mn-Bi or some rare-earth element-iron alloy exhibiting magnetic anisotropy in a direction perpendicular to the film surface and temperature-dependent coercive force, which may be formed on the base 1a by evaporation or sputtering. The magnetic recording medium 1 is attached at its center to a driving system 2 so as to be rotated thereby at a constant speed.

Opposite to the magnetic layer 1b is provided a light beam irradiation system 3 above the recording medium 1. The system 3 comprises a light beam generator 4 to emit a light beam such as a laser beam having necessary energy, a half mirror 5 reflecting the light beam from the generator 4 to apply it to the magnetic recording medium 1 at right angles thereto, a polarizer 6 disposed between the light beam generator 4 and the half mirror 5, and a condensing lens 7 interposed between the half mirror 5 and the magnetic recording medium 1 and converging a spot A (FIG. 3) of the light beam onto the magnetic layer 1b. The spot A of the light beam provided by the irradiation system 3 can be moved in the radial direction of the magnetic recording medium 1 by conventional means. Moreover, the irradiation system 3 is provided with a light sensor 8 disposed on the opposite side of the half mirror 5 to the condensing lens 7 and a detector 9 such as a photoelectric conversion element to receive light transmitted through the light sensor 8. With the light sensor 8 and the detector 9 which receive reflected light of the light beam from the magnetic recording medium 1, a signal can be detected for the reproduction of recorded information by utilizing a difference of the rotation angle between lights transmitted through or reflected by a magnetized the other portion of the magnetic layer 1b, these lights being subjected to different planes of polarization due to the magnetooptic Faraday effect or Kerr effect. The light beam emitted from the light beam generator 4 during playback operation, which is smaller than the energy required for the recording operation, is applied so that it may have an intensity just great enough to provide a required S/N ratio for reproduction.

Figure 2:
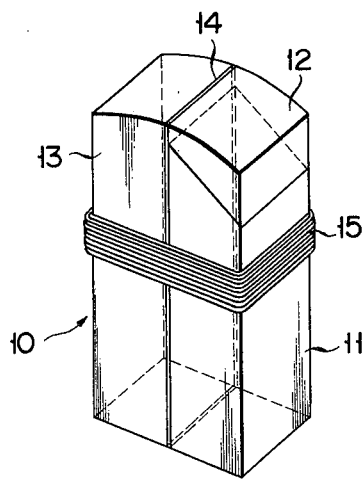

Opposite to the base 1a of the magnetic recording medium 1, moreover, there is disposed a magnetic head 10 of single-pole structure, whereby a signal is applied to the spot-irradiated portion. As shown in FIG. 2, the head 10 comprises a ferromagnetic body 11 such as ferrite, a nonmagnetic body 12 such as ceramic bonded to the tip end of the ferromagnetic body 11, a nonmagnetic body 13 such as ceramic, and a magnetic thin membrane 14 sandwiched therebetween. The distal end face of such structure is arcuate, and a winding or coil 15 is wound around a portion of the structure of the nonmagnetic body 12. The magnetic thin membrane 14 is formed of magnetic material with high saturated magnetic flux density, such as permalloy, Sendust, amorphous magnetic material, etc., having its thickness limited to approximately 1 μm or less. In contact with the magnetic thin membrane 14, the ferromagnetic body 11 is used for widening the magnetic path to reduce the magnetic resistance. In manufacturing the head 10, the ferromagnetic and nonmagnetic bodies 11 and 12 are first joined together, and one side face of the joined structure is ground. As the magnetic thin membrane 14 with a thickness of 1 μm or less, magnetic material such as permalloy is formed on the ground face by evaporation or sputtering, and then the previously ground one side face of the nonmagnetic body 13 is bonded to the magnetic thin membrane 14. Thereafter, one end face of the structure on the nonmagnetic body 12 side is grounded arcuate, and finally the winding 15 is set. The magnetic head 10 is so located that the exposed distal end portion of the magnetic thin membrane 14 faces the surface of the base 1a in contact therewith or in close vicinity thereto and at right angles thereto. Further, the magnetic head 10 moves in the radial direction of the magnetic recording medium 1 in synchronism with the movement of the spot A of the light beam while maintaining the positional relation with the spot A.

Figure 3:
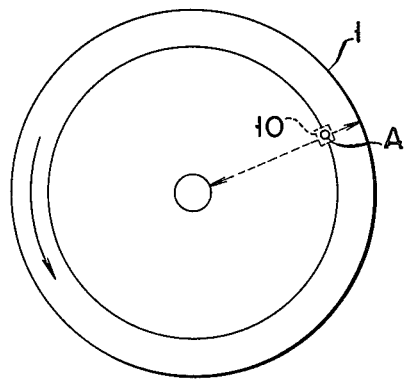

According to the present embodiment of the invention, the magnetic recording medium 1 is rotated and the spot A of the light beam and the magnetic head 10 move in the radial direction of the magnetic recording medium 1 in magnetic recording of information, so that a spiral track may be formed as represented by a full-line arrow in FIG. 3. Such recording operation is performed when the spot A of the light beam is applied to heat the corresponding portion of the magnetic layer 1b to reduce its coercive force, and a signal magnetic field is applied to the irradiated portion by the magnetic head 10. Hereupon, the signal magnetic field from the magnetic head 10 is produced when the ferromagnetic body 11 and the magnetic thin membrane 14 are excited in accordance with signal current flowing through the winding 15. The magnetic flux is converged onto the magnetic thin membrane 14 to increase fully the perpendicular magnetic field intensity. The magnetic head 10 is of single-pole structure, so that the signal magnetic field is limited to quite a narrow vertical region extending from the portion of the magnetic thin membrane 14 in contact with the base 1a to the magnetic layer 1b. Accordingly, even if the portion heated by the spot A of the light beam is extensive, providing a wide magnetizable region, the whole such magnetizable region will not be magnetized, and the magnetized region will be able to be limited to a very narrow area. Thus, the efficiency of high-density recording, as well as the playback resolution, may be improved.

This invention is not limited to the above-mentioned embodiment. For example, the invention may naturally be applied to recording on a tape-like magnetic recording medium, as well as to the recording on the disk-like magnetic recording medium. Since the tape-like magnetic recording medium may be provided with a thinner base, vertical impression of the signal magnetic field may be facilitated. The distal end of the magnetic head need not always touch the base, and may be located so as to face the base at a very narrow distance therefrom. Whether the distal end touches the base or not, it is advisable to form a protective film on the facing side of the magnetic head to the base, thereby preventing abrasion of the head and base and adverse effects on the running performance of the magnetic recording medium. Although the light beam irradiation system serves also as a playback system in the above-mentioned embodiment, the playback system may be provided separately from the irradiation system.

According to this invention, as described above, a light beam is applied to a magnetic recording medium by means of a light beam irradiation system, and a signal magnetic field is applied to an irradiated portion of the magnetic recording medium for magnetization by means of a magnetic head of single-pole structure having a magnetic thin membrane with high saturated magnetic flux density. Accordingly, a signal magnetic field fully intensive in a direction at right angles to the magnetic recording medium can be applied to an extremely narrow portion of the magnetizable region, so that the magnetized region can be limited to increase the efficiency of high-density recording and hence the playback resolution.

What is claimed is:

1. A thermomagnetic recording device for recording information on a magnetic recording medium with a magnetic recording section having magnetic anisotropy across the thickness thereof, comprising:

a light beam irradiation system for applying a light beam to said magnetic recording section to heat said magnetic recording section over a given area, thereby reducing the coercive force of the heated section; and a single-pole magnetic head including a ferromagnetic thin membrane of high permeability having an end face located opposite to said magnetic recording section, said ferromagnetic thin membrane extending perpendicularly to said magnetic recording section, a main body supporting said thin membrane, said main body including a pair of nonmagnetic half pieces forming a nonmagnetic distal end portion and a ferromagnetic proximal portion, said distal end portion comprising said end face of the head, said ferromagnetic thin membrane being held between both said half pieces and between said nonmagnetic portions at the portion of the head facing the magnetic recording medium and an electrical coil coupled to said main body for applying a perpendicular magnetic field to said recording section through said end face of said thin membrane, said ferromagnetic thin membrane having a thickness which is smaller than the dimension of said given area which is heated by said light beam irradiation system such that only part of the given heated aea is magnetized by said ferromagnetic thin membrane.

2. A thermomagnetic recording device according to claim 1, wherein said light beam irradiation system and said single-pole magnetic head face each other with said magnetic recording medium therebetween.

3. A thermomagnetic recording device according to claim 2, wherein said light beam irradiation system includes a laser light source and a mirror reflecting laser light from said laser light source onto said magnetic recording section.

4. A thermomagnetic recording device according to claim 3, wherein said mirror comprises of a half mirror, and further comprising a detector receiving reflected light fraom said magnetic recording section through said half mirror and converting said received light into an electric signal.

5. A thermomagnetic recording device according to any one of claims 1, 2, 3 or 4, wherein said coil is wound around said main body of said magnetic head.

6. A thermomagnetic recording device according to any one of claims 1, 2, 3 or 4, wherein said given area which is heated by said light beam irradiation system is a generally circular area, and wherein said thermomagnetic thin membrane has a thickness which is smaller than the diameter of the given heated area.

7. A thermomagnetic recording device according to claim 6, further comprising a light sensor interposed between said half mirror and said detector.

8. A thermomagnetic recording device according to claim 1, wherein said light beam irradiation system comprises a polarizer through which said light beam is passed before said light beam is applied to said magnetic recording section.

* * * * *

UNITED STATES PATENT AND TRADEMARK OFFICE
CERTIFICATE OF CORRECTION

PATENT NO. : 4,363,052

DATED : December 7, 1982

INVENTOR(S) : Naohiro HANAOKA

It is certified that error appears in the above-identified patent and that said Letters Patent is hereby corrected as shown below:

In the Abstract:

line 4, change "mechanism" to --system for--;

Column 4 (claim 1), line 34, after "heated" change "aea" to --area--;

Column 4 (claim 4), line 46, after "mirror comprises" delete "of";

Column 4 (claim 6), lines 57-58, change "thermomagnetic" to --ferromagnetic--.

Signed and Sealed this

Fifth Day of April 1983

[SEAL]

Attest:

Attesting Officer

GERALD J. MOSSINGHOFF

Commissioner of Patents and Trademarks